United States Patent
Anglin et al.

(10) Patent No.: US 10,667,134 B2
(45) Date of Patent: May 26, 2020

(54) TOUCH-SHARE CREDENTIAL MANAGEMENT ON MULTIPLE DEVICES

(71) Applicant: INTERNATIONAL BUSINESS MACHINES CORPORATION, Armonk, NY (US)

(72) Inventors: Debbie A. Anglin, Leander, TX (US); Yu Gu, Cedar Park, TX (US); Su Liu, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 215 days.

(21) Appl. No.: 15/356,707

(22) Filed: Nov. 21, 2016

(65) Prior Publication Data

US 2018/0145956 A1 May 24, 2018

(51) Int. Cl.
*H04W 12/08* (2009.01)
*H04L 29/06* (2006.01)
(Continued)

(52) U.S. Cl.
CPC ......... *H04W 12/08* (2013.01); *H04L 63/0861* (2013.01); *H04L 63/102* (2013.01);
(Continued)

(58) Field of Classification Search
CPC ..... H04W 12/06; H04W 12/08; H04W 84/18; H04L 63/0861; H04L 63/105; G06F 21/32
(Continued)

(56) References Cited

U.S. PATENT DOCUMENTS 5,565,939 A * 10/1996 Fujieda ............... A61B 3/107
351/205
8,713,704 B2 4/2014 Davis et al.
(Continued)

FOREIGN PATENT DOCUMENTS

KR 20090009759 A * 1/2009 ......... H04L 63/0861
WO WO-2008085084 A2 * 7/2008 ......... G06K 9/00885
(Continued)

OTHER PUBLICATIONS

Chakravarthy, S. Deepan, P. Kingsly, Mahendran Sadhasivam, and C. Jayakumar. "Multi-modal biometric approach to enable high security in mobile adhoc network." In Proceedings of the International Conference on Advances in Computing, Communications and Informatics, pp. 1148-1154. ACM, 2012. (Year: 2012).*
(Continued)

*Primary Examiner* — Luu T Pham
*Assistant Examiner* — Walter J Malinowski
(74) *Attorney, Agent, or Firm* — Cantor Colburn LLP; Noah Sharkan (57) ABSTRACT

Embodiments include method, systems and computer program products for credential management. Aspects include obtaining a first biometric information by a first processing device, wherein the first processing device has stored one or more credentials. Then, responsive to obtaining the first biometric information, the method determines whether the first biometric information is valid. The method then creates, via the first processing device, an ad-hoc network based upon the determination that the first biometric information is valid. The method, then receives a second biometric information from a second processing device through the ad-hoc network. And, then the method analyzes the second biometric information to determine whether the second biometric information is valid.

12 Claims, 3 Drawing Sheets

(51) Int. Cl.
*H04W 12/06* (2009.01)
*H04W 84/18* (2009.01)

(52) U.S. Cl.
CPC .......... *H04L 63/105* (2013.01); *H04W 12/06* (2013.01); *H04W 84/18* (2013.01)

(58) Field of Classification Search
USPC .................................. 726/4, 7, 19; 713/168
See application file for complete search history.

(56) References Cited

U.S. PATENT DOCUMENTS

| | | | | |
|---|---|---|---|---|
| 9,032,501 B1* | 5/2015 | Martin | .................. | H04L 9/3213 726/10 |
| 9,166,786 B2* | 10/2015 | Napoli | .................. | H04L 9/0897 |
| 9,235,746 B2 | 1/2016 | Jung et al. | | |
| 9,288,198 B2 | 3/2016 | Desoto et al. | | |
| 9,436,818 B1* | 9/2016 | Tooley, II | .................. | G06F 21/32 |
| 10,255,595 B2* | 4/2019 | Van Os | .................. | G06Q 20/32 |
| 2002/0126881 A1* | 9/2002 | Langley | .................. | G06K 9/00006 382/124 |
| 2003/0076962 A1* | 4/2003 | Roh | .................. | H04L 9/006 380/282 |
| 2003/0125057 A1* | 7/2003 | Pesola | .................. | G06F 16/176 455/502 |
| 2007/0047477 A1* | 3/2007 | Zheng | .................. | H04L 63/08 370/328 |
| 2007/0140145 A1* | 6/2007 | Kumar | .................. | G06F 21/32 370/254 |
| 2007/0240204 A1* | 10/2007 | Somekawa | .................. | H04L 63/08 726/5 |
| 2008/0141313 A1* | 6/2008 | Kato | .................. | H04N 7/1675 725/62 |
| 2008/0209545 A1* | 8/2008 | Asano | .................. | H04L 9/3273 726/19 |
| 2008/0282327 A1* | 11/2008 | Winget | .................. | H04L 63/10 726/4 |
| 2008/0313726 A1* | 12/2008 | Gardner | .................. | H04L 9/3273 726/9 |
| 2009/0023393 A1* | 1/2009 | Behzad | .................. | H04W 12/06 455/73 |
| 2009/0025081 A1* | 1/2009 | Quigley | .................. | G06F 21/32 726/21 |
| 2009/0097719 A1* | 4/2009 | Lim | .................. | G06F 21/32 382/124 |
| 2009/0113523 A1* | 4/2009 | Vedula | .................. | H04L 63/0815 726/4 |
| 2009/0282130 A1* | 11/2009 | Antoniou | .................. | H04L 41/0886 709/220 |
| 2009/0292641 A1* | 11/2009 | Weiss | .................. | G06F 21/32 705/66 |
| 2010/0049987 A1* | 2/2010 | Ettorre | .................. | G06F 21/32 713/186 |
| 2010/0185871 A1* | 7/2010 | Scherrer | .................. | G06F 21/6218 713/186 |
| 2012/0106449 A1* | 5/2012 | Shibuya | .................. | H04W 12/06 370/328 |
| 2012/0328101 A1* | 12/2012 | Lakshminarayanan | .................. | H04L 63/0823 380/258 |
| 2013/0227664 A1* | 8/2013 | McKay | .................. | H04L 9/3231 726/7 |
| 2013/0290701 A1* | 10/2013 | Takenaka | .................. | H04L 9/0833 713/153 |
| 2014/0109243 A1* | 4/2014 | Ting | .................. | G06F 21/31 726/30 |
| 2014/0235166 A1* | 8/2014 | Molettiere | .................. | H04B 7/26 455/41.2 |
| 2014/0282106 A1 | 9/2014 | Smith et al. | | |
| 2015/0085848 A1* | 3/2015 | Reunamaki | .................. | H04W 12/04 370/338 |
| 2015/0124791 A1 | 5/2015 | Mazandarany et al. | | |
| 2015/0172404 A1* | 6/2015 | Sathish | .................. | H04W 12/06 709/217 |
| 2015/0172925 A1* | 6/2015 | Leppanen | .................. | H04W 12/04 726/7 |
| 2015/0278498 A1* | 10/2015 | Hong | .................. | G06F 21/32 340/5.82 |
| 2015/0324569 A1* | 11/2015 | Hong | .................. | G06F 21/32 345/174 |
| 2015/0334108 A1* | 11/2015 | Khalil | .................. | G06F 21/31 726/8 |
| 2015/0363632 A1* | 12/2015 | Ahn | .................. | G06F 3/0412 382/124 |
| 2015/0379255 A1* | 12/2015 | Konanur | .................. | G06F 21/35 726/19 |
| 2015/0381614 A1* | 12/2015 | Hildreth | .................. | H04W 4/21 726/7 |
| 2016/0012272 A1* | 1/2016 | Wong | .................. | G06F 21/32 382/124 |
| 2016/0014605 A1 | 1/2016 | Robinton et al. | | |
| 2016/0036719 A1* | 2/2016 | Alicherry | .................. | H04L 67/2828 714/15 |
| 2016/0036790 A1* | 2/2016 | Shastry | .................. | H04L 63/0435 713/168 |
| 2016/0042219 A1 | 2/2016 | Bae et al. | | |
| 2016/0050213 A1* | 2/2016 | Storr | .................. | G06F 21/32 726/6 |
| 2016/0057139 A1* | 2/2016 | McDonough | .................. | H04L 63/0861 726/6 |
| 2016/0070899 A1* | 3/2016 | Vemula | .................. | G06F 21/606 726/19 |
| 2016/0080936 A1 | 3/2016 | Rachuri et al. | | |
| 2016/0094550 A1* | 3/2016 | Bradley | .................. | H04W 4/80 726/7 |
| 2016/0099938 A1* | 4/2016 | Seo | .................. | H04L 63/0853 713/169 |
| 2016/0099973 A1 | 4/2016 | Tipton et al. | | |
| 2016/0127900 A1* | 5/2016 | John Archibald | .................. | H04W 12/06 726/7 |
| 2016/0142211 A1* | 5/2016 | Metke | .................. | H04L 9/3263 713/175 |
| 2016/0142405 A1* | 5/2016 | Deffeyes | .................. | H04L 63/0861 726/7 |
| 2016/0149905 A1* | 5/2016 | Wang | .................. | G06K 9/00281 455/41.2 |
| 2016/0191481 A1* | 6/2016 | Zimmer | .................. | H04L 63/0428 713/168 |
| 2016/0224973 A1* | 8/2016 | Van Os | .................. | G06Q 20/32 |
| 2016/0248744 A1* | 8/2016 | Adderly | .................. | H04L 63/08 |
| 2016/0352887 A1* | 12/2016 | Na | .................. | H04M 1/72527 |
| 2017/0026831 A1* | 1/2017 | Jung | .................. | H04L 63/08 |
| 2017/0034160 A1* | 2/2017 | Brands | .................. | H04L 63/0861 |
| 2017/0069148 A1* | 3/2017 | Gilbertson | .................. | G07C 9/00087 |
| 2017/0142589 A1* | 5/2017 | Park | .................. | H04W 12/08 |
| 2017/0180335 A1* | 6/2017 | Quinlan | .................. | H04L 63/08 |
| 2017/0193208 A1* | 7/2017 | Ashley | .................. | G06F 21/32 |
| 2017/0262622 A1* | 9/2017 | Abrams | .................. | G06F 21/32 |
| 2017/0286656 A1* | 10/2017 | Kohli | .................. | G06F 21/32 |
| 2017/0374065 A1* | 12/2017 | Shtraym | .................. | H04L 63/0861 |
| 2018/0375874 A1* | 12/2018 | Musik | .................. | H04W 12/06 |

FOREIGN PATENT DOCUMENTS

WO      2015005959 A1      1/2015
WO      WO-2016200084 A1 *  12/2016    ............... G06K 9/00

OTHER PUBLICATIONS

Hu, Jhe-Yi, Chien-Cheng Sueng, Wei-Hsiang Liao, and Chian C. Ho. "Android-based mobile payment service protected by 3-factor authentication and virtual private ad hoc networking." In Computing, Communications and Applications Conference (ComComAp), 2012, pp. 111-116. IEEE, 2012. (Year: 2012).*

Bansal, Gaurav, John B. Kenney, and Aaron Weinfield. "Cross-validation of DSRC radio testbed and NS-2 simulation platform for vehicular safety communications." In Vehicular Technology Conference (VTC Fall), 2011 IEEE, pp. 1-5. IEEE, 2011. (Year: 2011).*

(56) References Cited

OTHER PUBLICATIONS

Xiao, Qinghan. "A biometric authentication approach for high security ad-hoc networks." In Proceedings from the Fifth Annual IEEE SMC Information Assurance Workshop, 2004., pp. 250-256. IEEE, 2004. (Year: 2004).*

Harrison, Chris, Hrvoje Benko, and Andrew D. Wilson. "OmniTouch: wearable multitouch interaction everywhere." In Proceedings of the 24th annual ACM symposium on User interface software and technology, pp. 441-450. ACM, 2011. (Year: 2011).* http://www.spyontech.com/apps/android/instawifi-new-ways-to-share-wifi-network-within-qr-code.htm, pp. 1-6.

Pinola, How to Share Your Wi-Fi Network with Friends, No Password Typing Required, Jun. 28, 2016, pp. 1-3.

* cited by examiner

TOUCH-SHARE CREDENTIAL MANAGEMENT ON MULTIPLE DEVICES

BACKGROUND

The present disclosure relates to credential management and, more specifically, to methods and systems for touch-share credential management on multiple devices.

Access to wireless networks has become an expectation for individuals that frequent restaurants, coffee shops, airports, and the like. Typically, access to these wireless networks is provided free of charge to customers as an additional service. However, access to these wireless networks does require the need for a login and passcode for each individual electronic device requesting access to the wireless network. In addition to customers at places of businesses requesting access to wireless networks, guests located at an individual's home may request the same type of access to the local wireless network for their various devices.

SUMMARY

Embodiments include a computer-implemented method for credential management, the method includes obtaining a first biometric information by a first processing device, wherein the first processing device has stored one or more credentials. Then, responsive to obtaining the first biometric information, the method includes determining whether the first biometric information is valid. The method then includes creating, via the first processing device, an ad-hoc network based upon the determination that the first biometric information is valid. The method then includes receiving a second biometric information from a second processing device through the ad-hoc network. And, then the method includes analyzing the second biometric information to determine whether the second biometric information is valid.

Embodiments include a computer system for credential management, the computer system including a server having a processor, the processor configured to obtain a first biometric information by a first processing device, wherein the first processing device has stored one or more credentials. Then, responsive to obtaining the first biometric information, the processor determines whether the first biometric information is valid. The processor then creates, via the first processing device, an ad-hoc network based upon the determination that the first biometric information is valid. The processor then receives a second biometric information from a second processing device through the ad-hoc network. And, then the processor analyzes the second biometric information to determine whether the second biometric information is valid.

Embodiments also include a computer program product for credential management, the computer program product including a non-transitory computer readable storage medium having program instructions embodied therewith, the program instructions executable by a processor to cause the processor to perform obtaining a first biometric information by a first processing device, wherein the first processing device has stored one or more credentials. Then, responsive to obtaining the first biometric information, the program instructions executable by the processor causes the processor to further perform determining whether the first biometric information is valid. The processor then creates, via the first processing device, an ad-hoc network based upon the determination that the first biometric information is valid. The processor then receives a second biometric information from a second processing device through the ad-hoc network. And, then the processor analyzes the second biometric information to determine whether the second biometric information is valid.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

In accordance with exemplary embodiments of the disclosure, methods, systems and computer program products for touch-share credential management are provided. In one or more exemplary embodiments, methods for touch share credential management include utilizing biometric data to share a wireless network credential from a first device to a second device. This method includes receiving biometric data, such as a fingerprint, from a user of a first device. Based upon this biometric data, the first device creates an ad-hoc network. The user of the first device then submits biometric data to a second device in the form of a fingerprint or any other type of biometric data. The second device recognizes the biometric data as being foreign and in response to this recognition of foreign biometric data; the second device searches and connects to the ad-hoc network created by the first device. The second device then transmits the biometric data to the first device via the ad-hoc network. The first device analyzes the biometric data to determine if the biometric data is valid. Based upon a determination the biometric data is valid, the first device then transmits a credential to the second device which the second device can use to access the wireless network.

Figure 1:
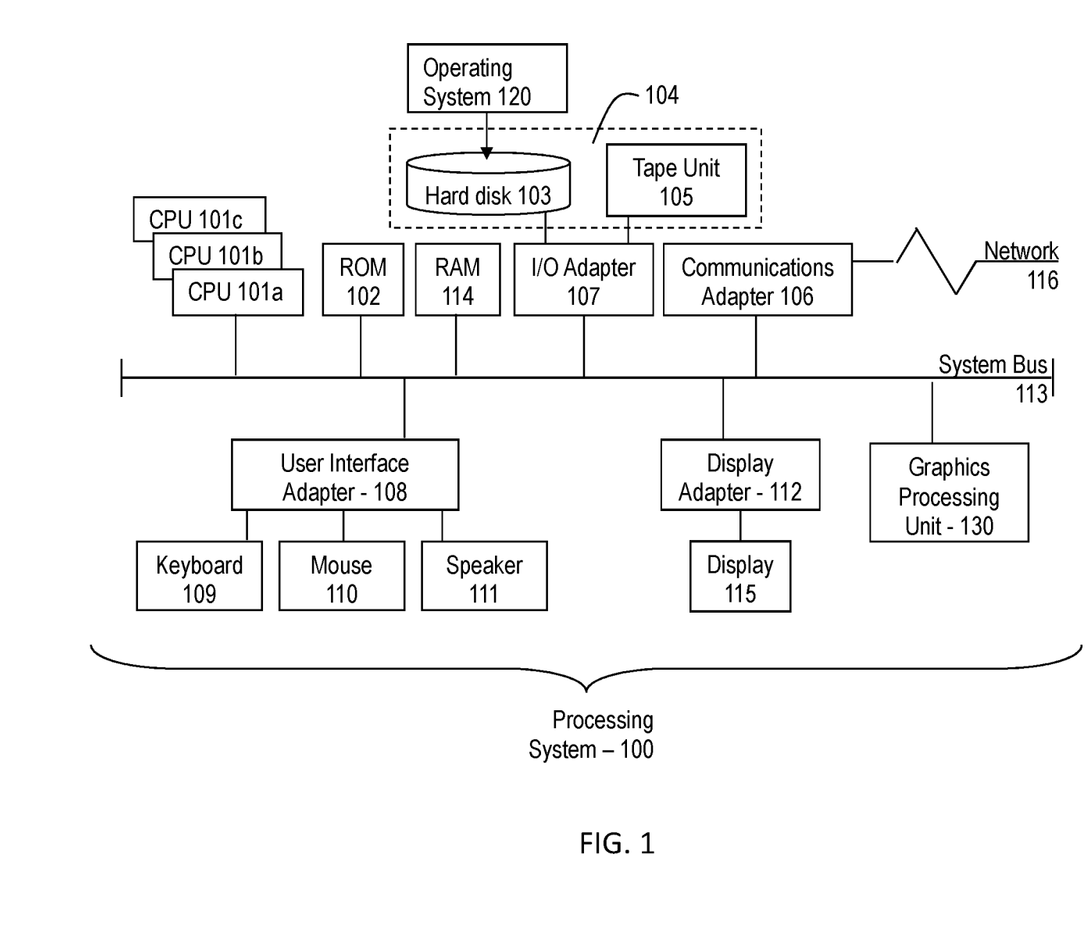
FIG. 1 illustrates a block diagram of a computer system for use in practicing the teachings herein.

Referring to FIG. 1, there is shown an embodiment of a processing system 100 for implementing the teachings herein. In this embodiment, the system 100 has one or more central processing units (processors) 101*a*, 101*b*, 101*c*, etc. (collectively or generically referred to as processor(s) 101). In one or more embodiments, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113.

I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system coordinate the functions of the various components shown in FIG. 1.

Figure 2:
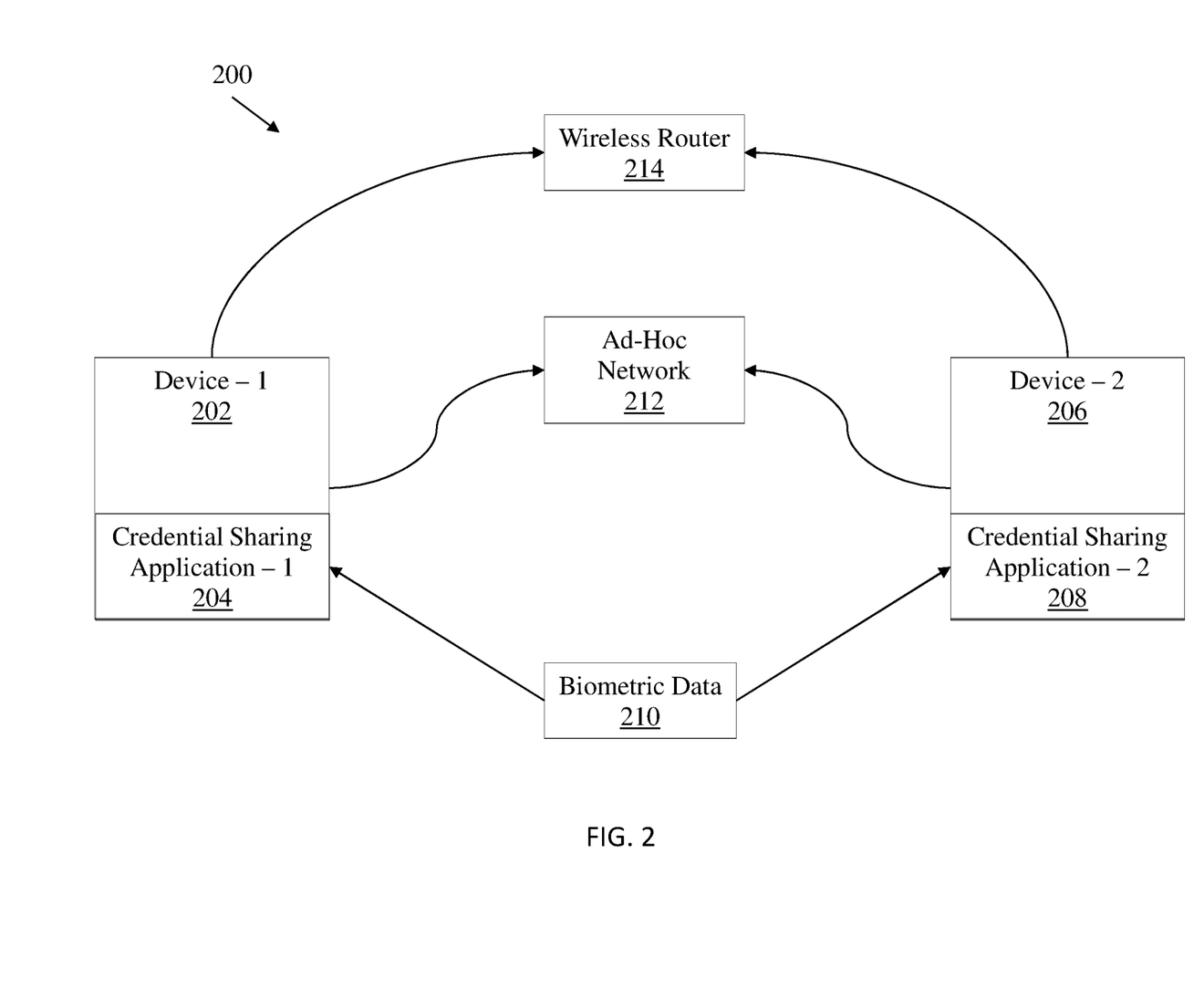
FIG. 2 illustrates a block diagram of a system for credential management in accordance with one or more embodiments.

Referring to FIG. 2 there is shown a system 200 for credential management according to one or more embodiments. The system 200 includes a first device 202, a second device 206, biometric data (information) 210, an ad-hoc network 212, and a wireless router 214. The first device 202 includes a first credential sharing application 204. The second device 206 includes a second credential sharing application 208.

The first device 202 and second device 206 are each configured to receive biometric data 210 through a biometric sensor either attached to the devices or in electronic communication with the devices. The first device 202 and second device 206 can be a smart device such as, for example, a smartphone, a tablet, a computer, or the like.

The first device 202 is capable of creating an ad-hoc network 212. The ad-hoc network 212 can be any type of ad-hoc network such as, for example, a Bluetooth® network. The second device 206 is capable of connecting to the ad-hoc network 212 created by the first device 202.

The first credential sharing application 204 includes one or more credentials for logging into to one or more networks. In the illustrated embodiment, the one or more networks include a wireless router 214 that is connected to the internet. In another embodiment, the one or more credentials may allow access to a cellular network such as a 4G network. Additionally, the first credential sharing application 204 includes stored biometric information for a user of the first device 202. The first credential sharing application 204 can also include stored biometric information for any designated individual that may use the first device 202. The second credential sharing application 208 includes one or more credentials for logging into one or more networks as well as stored biometric information for any user of the second device 206.

In one or more embodiments, the system 200 can be utilized to share access to credentials for logging into a wireless network. A user of the first device 202 can share access to a user of the second device 206 through the following process. The user of the first device 202 submits biometric data 210 to the first device 202. The biometric data 210 can be any type of biometric data such as a fingerprint. The first credential sharing application 204 analyzes the biometric data to determine if the biometric data 210 is known or valid by comparing the submitted biometric data to the stored biometric data in the first credential sharing application 204. If the biometric data is valid, the first device 202 creates an ad-hoc network 212. The user of the first device 202 can then submit biometric data 210 to the second device 206. The second credential sharing application 208 will analyze the biometric data 210 submitted by the user of the first device 202 to determine if the biometric data is known or valid by comparing the submitted biometric data to the stored biometric data in the second credential sharing application 208. If the submitted biometric data is foreign or invalid, the second credential application 208 will cause the second device 206 to search for an ad-hoc network 212. When the ad-hoc network 212 is found by the second device 206, it will connect to the ad-hoc network and transmit the submitted biometric data 210 to the first device 202 through the ad-hoc network. The first credential sharing application 204 will analyze the biometric data transmitted by the second device 206 to determine if the biometric data is valid. If the biometric data is valid, the first credential sharing application 204 will cause the first device 202 to transmit one or more credentials to the second device 206. The second device 206, with the credentials transmitted by the first device 202, can then access the wireless network via the wireless router 214.

In one or more embodiments, the credentials shared with the second device 206 can determine an access level to the wireless network. For example, the first device user may only wish to share partial access to the network because the user of the second device may be a customer in a restaurant. Access can be limited to certain websites or certain applications on the second device 206. The access level can be determined by the type of biometric data 210 submitted to the second device. For example, if the user of the first device 202 submits his or her ring finger as the biometric data input, the access may be a partial or limited access to the network. If the first device 202 user submits his or her middle finger as the biometric data input, the access to the wireless network can be a full access. Access rights and access levels can be configured by the user and stored in the credential sharing application 204.

In one more embodiments, the system 200 can require the biometric data 210 be submitted at or around the same time for the first device 202 and the second device 206. For example, if the two devices are smartphones, the user sharing his or her credentials can place his or her thumb on the first smartphone and another finger on the second smartphone at the same time. The fingerprints can both be analyzed before sharing the login credentials with the second smartphone. In another embodiment, the system 200 can allow the biometric data 210 to be submitted at different times to share the credential information between the first device 202 and the second device 206.

In one or more embodiments, if the biometric data 210 submitted to the second device 206 is determined to be invalid, the first device 202 can send a denial to the second device 206 to indicate the biometric data was invalid and no credential will be shared with the second device 206 for the wireless network In one or more embodiments, the first credential sharing application 204 can utilize a global positioning system (GPS) to verify proper access to wireless network. For example, if a user of the first device is trying to share credentials for logging into a wireless network and the first credential sharing application 204 has credentials for both a home wireless network and a work wireless network, the GPS location of the first device 202 can determine which credential is given. In the example, the GPS location may be at the workplace of the user of the first device 202 such that any credentials shared will be the credentials for access to the workplace wireless network instead of the home network.

In one or more embodiments, the first credential sharing application 204 can store the biometric data and credential information locally on the first device 202 or the first credential sharing application 204 can utilize a third party service to store the biometric data and credential information in a cloud computing environment. The third party service can be accessed via a wireless internet or cellular network by the first device 202.

In one or more embodiments, the biometric data obtained by first credential sharing application 204 can be stored in a secured storage device. The secured storage device can be physically present in the first device or be in electronic communication with the first device. In another embodiment, a third party secure storage device that is remote from the first device can be utilized to store the biometric data. The secured storage device can be compliant with federal, state, and local laws and regulations regarding privacy of biometric data. For biometric data stored on a remote storage device, data encryption techniques can be utilized to transmit the biometric data to the remote storage device to ensure privacy and security. When biometric data is transmitted between devices, the ad-hoc network can utilize data encryption techniques to protect from potential interception of the biometric data by third parties.

In the exemplary embodiment, there is shown only a first device 202 and a second device 206. However, in one or more embodiments, any number of devices can be utilized to share credentials for a wireless network. For example, biometric data can be submitted to three devices that can connect to the ad-hoc network to receive wireless credentials. In this example, a user of the first device (credential sharing device) can submit biometric data, such as fingerprint, to create an ad-hoc network. The user can then submit biometric data to the three requesting devices by, for example, utilizing three different fingers placed on a fingerprint scanner of each of the three requesting devices. The three requesting devices can connect to the ad-hoc network to transmit the biometric data to the first device. Upon validation of the biometric data, each of the three requesting devices will receive a login credential for the wireless network.

Figure 3:
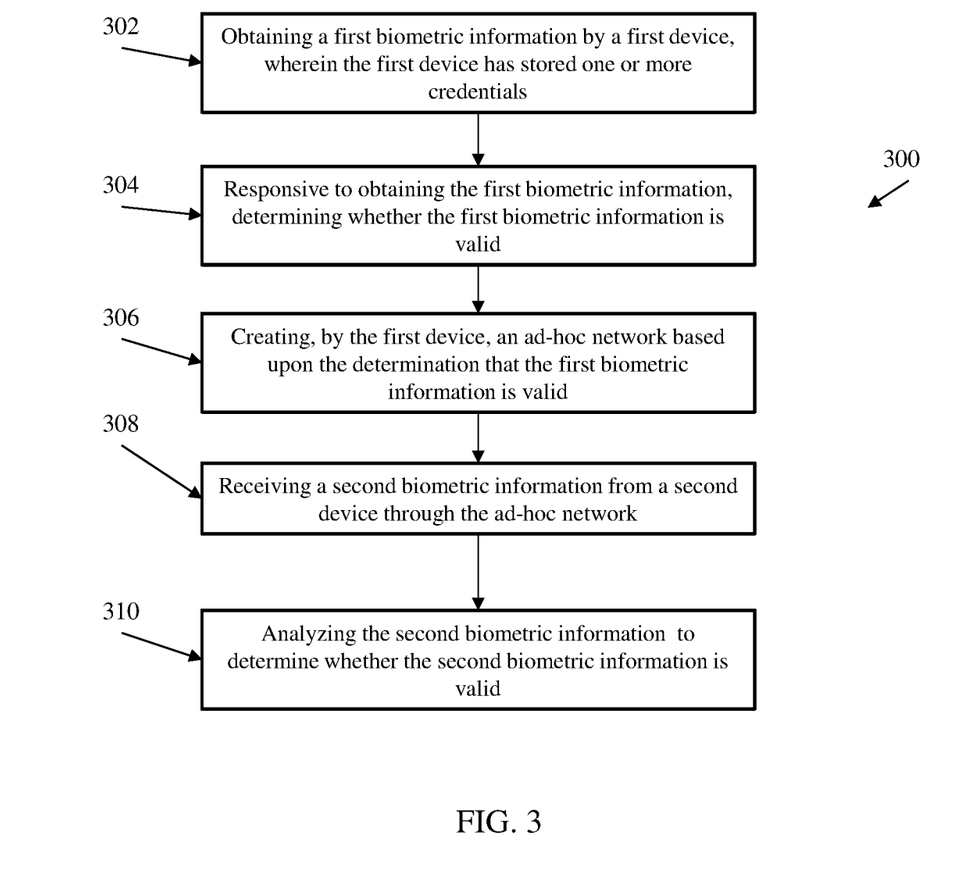
FIG. 3 illustrates a flow diagram of a method for credential management in accordance with one or more embodiments.

Referring now to FIG. 3 there is shown a flow diagram of a method 300 for credential management according to one or more embodiments. The method 300 includes, at block 302, obtaining a first biometric information by a first device, wherein the first device has stored one or more credentials. At block 304, the method 300 includes responsive to obtaining the first biometric information, determining whether the first biometric information is valid. The method 300 includes creating, by the first device, an ad-hoc network based upon the determination that the first biometric information is valid, as shown at block 306. At block 308, the method includes receiving a second biometric information from a second device through the ad-hoc network. Next, at block 310, the method 300 includes analyzing the second biometric information to determine whether the second biometric information is valid.

Additional processes may also be included. It should be understood that the processes depicted in FIG. 3 represent illustrations, and that other processes may be added or existing processes may be removed, modified, or rearranged without departing from the scope and spirit of the present disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for credential management, the method comprising:
   receiving, by a first processing device, a first biometric information, wherein the first processing device has stored one or more credentials,
   wherein the first biometric information comprises a first finger engaged with a first fingerprint scanner associated with the first processing device, wherein a first fingerprint associated with the first finger is read by the fingerprint scanner, and
   wherein the finger print is associated with a first user;
   responsive to obtaining the first biometric information, determining whether the first biometric information is valid;
   creating, by the first processing device, an ad-hoc network based upon the determination that the first biometric information is valid, wherein the ad-hoc network is active while the first finger is engaged with the first fingerprint scanner associated with the first processing device;
   receiving a second biometric information from a second processing device through the ad-hoc network, wherein the second processing device transmits the second biometric information over the ad-hoc network to the first processing device based on a determination that the second biometric information is foreign to the second processing device, and
   wherein the second biometric information comprises a second finger engaged with a second fingerprint scanner associated with the second processing device, wherein a second fingerprint associated with the second finger is read by the second fingerprint scanner, and
   wherein the second fingerprint is associated with the first user; analyzing the second biometric information to determine whether the second biometric information is valid;
   transmitting, by the first processing device over the ad-hoc network, a credential from the one or more credentials to the second processing device based on determining that the second biometric information is valid and based on a determination that the second finger is engaged with the second fingerprint scanner while the first finger is engaged with the first fingerprint scanner; and
   transmitting a denial to the second processing device through the ad-hoc network based upon the second biometric information being invalid.

2. The method of claim 1, wherein the second biometric information is obtained by the second processing device from a user of the first processing device.

3. The method of claim 1 further comprising:
determining a location of the first processing device; and
transmitting a credential from the one or more credentials to the second processing device through the ad-hoc network based upon the location of the first processing device and based upon the second biometric information being valid.

4. The method of claim 1 further comprising:
accessing a wireless network by the second processing device by utilizing the credential.

5. The method of claim 4, wherein the credential comprises an access level for the wireless network.

6. The method of claim 5, wherein the access level comprises at least one of a full access and a partial access.

7. A computer system for credential management, the computer system comprising:
a first processing device configured to:
obtain a first biometric information, wherein the first processing device has stored one or more credentials,
wherein the first biometric information comprises a first finger engaged with a first fingerprint scanner associated with the first processing device, wherein a fingerprint associated with the first finger is read by the first fingerprint scanner, and
wherein the finger print is associated with a first user;
responsive to obtaining the first biometric information, determine whether the first biometric information is valid;
create an ad-hoc network based upon the determination that the first biometric information is valid, wherein the ad-hoc network is active while the first finger is engaged with the first fingerprint scanner associated with the first processing device;
receive a second biometric information from a second processing device through the ad-hoc network, wherein the second processing device transmits the second biometric information over the ad-hoc network to the first processing device based on a determination that the second biometric information is foreign to the second processing device, and
wherein the second biometric information comprises a second finger engaged with a second fingerprint scanner associated with the second processing device, wherein a second fingerprint associated with the second finger is read by the second fingerprint scanner, and
wherein the second fingerprint is associated with the first user;
analyze the second biometric information to determine whether the second biometric information is valid;
transmit, over the ad-hoc network, a credential from the one or more credentials to the second processing device based on determining that the second biometric information is valid and based on a determination that the second finger is engaged with the second fingerprint scanner while the first finger is engaged with the first fingerprint scanner; and
transmit a denial to the second processing device through the ad-hoc network based upon the second biometric information being invalid.

8. The computer system of claim 7, wherein the second biometric information is obtained by the second processing device from a user of the first processing device.

9. The computer system of claim 7, wherein the first processing device is further configured to:
determine a location of the first processing device;
transmit a credential from the one or more credentials to the second processing device through the ad-hoc network based upon the location of the first processing device and based upon the second biometric information being valid.

10. A computer program product for credential management, the computer program product comprising a non-transitory computer readable storage medium having program instructions embodied therewith, the program instructions executable by a processor to cause the processor to perform:
obtaining, by a first processing device, a first biometric information, wherein the first processing device has stored one or more credentials,
wherein the first biometric information comprises a first finger engaged with a first fingerprint scanner associated with the first processing device, wherein a first fingerprint associated with the first finger is read by the fingerprint scanner, and
wherein the second fingerprint is associated with the first user;
responsive to obtaining the first biometric information, determining whether the first biometric information is valid;
creating, by the first processing device, an ad-hoc network based upon the determination that the first biometric information is valid, wherein the ad-hoc network is active while the first finger is engaged with the first fingerprint scanner associated with the first processing device;
receiving a second biometric information from a second processing device through the ad-hoc network, wherein the second processing device transmits the second biometric information over the ad-hoc network to the first processing device based on a determination that the second biometric information is foreign to the second processing device, and
wherein the second biometric information comprises a second finger engaged with a second fingerprint scanner associated with the second processing device, wherein a second fingerprint associated with the second finger is read by the second fingerprint scanner, and
wherein the second fingerprint is associated with the first user;
analyzing the second biometric information to determine whether the second biometric information is valid;
transmitting, by the first processing device over the ad-hoc network, a credential from the one or more credentials to the second processing device based on determining that the second biometric information is valid and based on a determination that the second finger is engaged with the second fingerprint scanner while the first finger is engaged with the first fingerprint scanner; and
transmitting a denial to the second processing device through the ad-hoc network based upon the second biometric information being invalid.

11. The computer program product of claim 10, wherein the second biometric information is obtained by the second processing device from a user of the first processing device.

12. The computer program product of claim 10 wherein the program instructions executable by the processor cause the processor to further perform:
determining a location of the first processing device;
transmitting a credential from the one or more credentials to the second processing device through the ad-hoc network based upon the location of the first processing device and based upon the second biometric information being valid.

\* \* \* \* \*